Patented Oct. 27, 1942

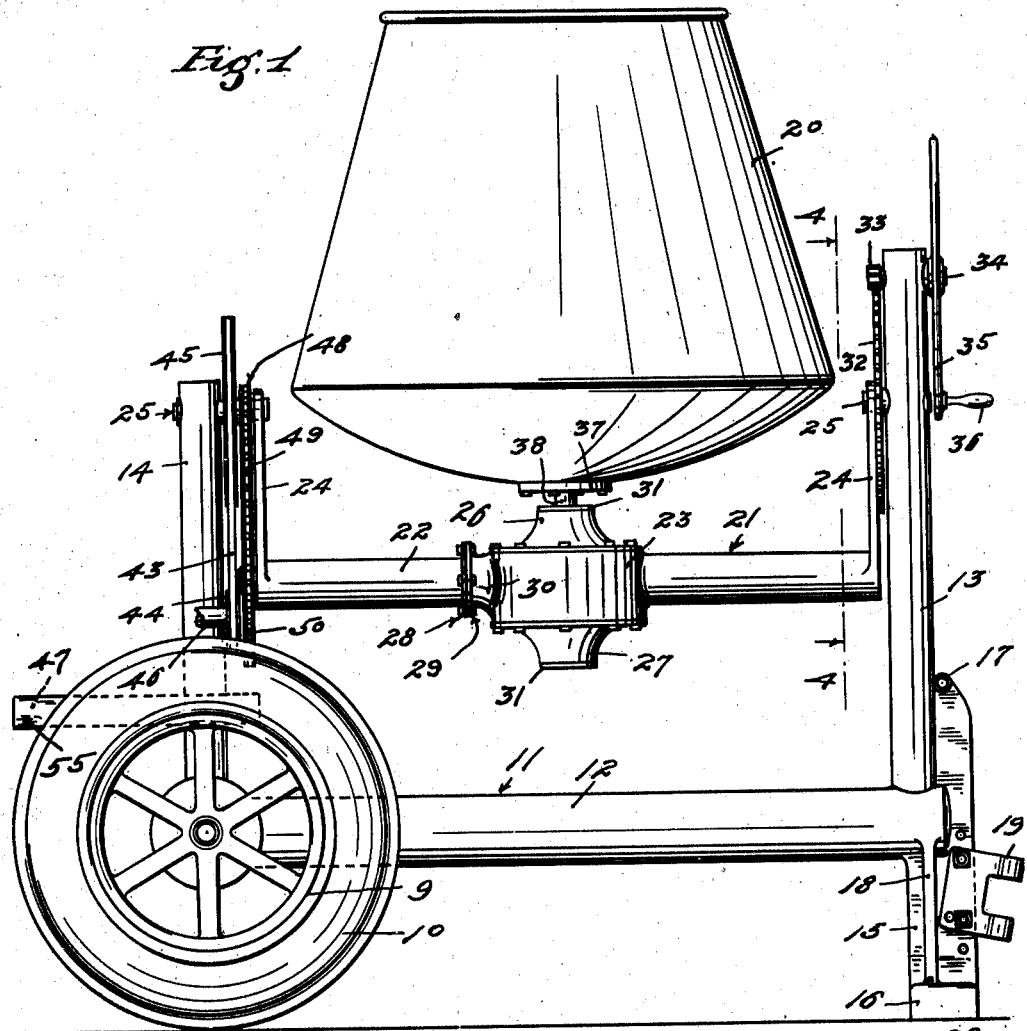

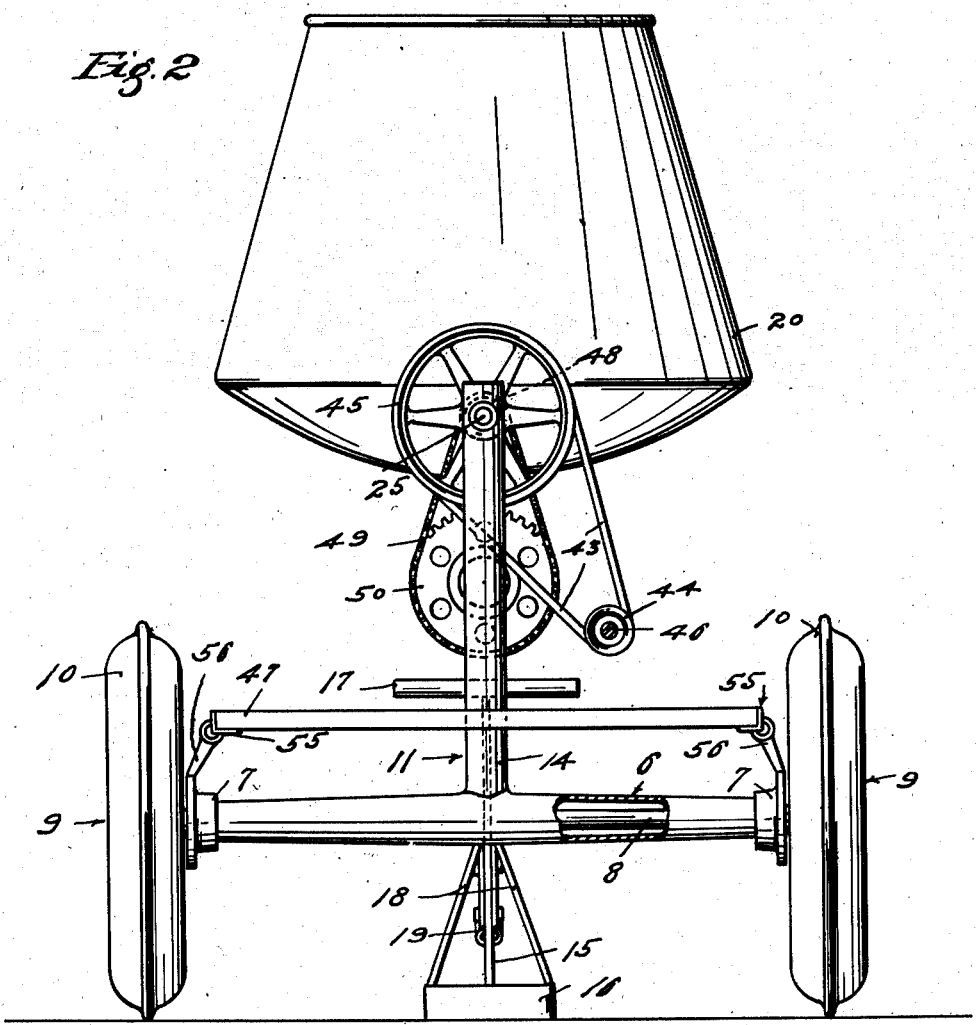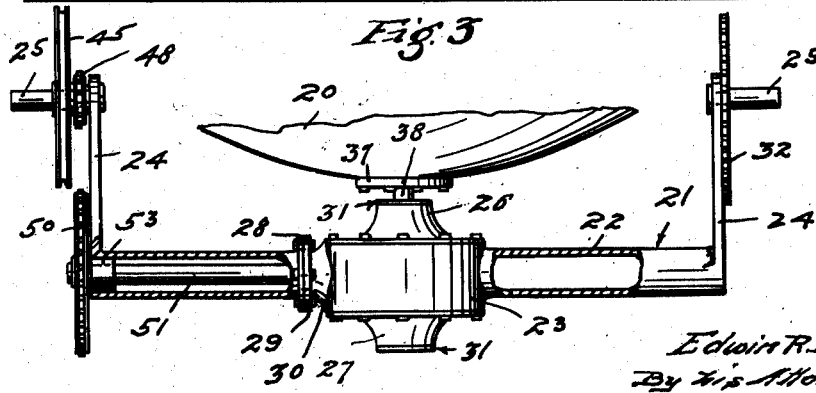

2,299,888

UNITED STATES PATENT OFFICE 2,299,888

CONCRETE MIXER

Edwin R. Fesenmaier, Morton, Minn.

Application September 8, 1941, Serial No. 409,969

6 Claims. (Cl. 259—177)

My invention relates to improvements in concrete mixers.

The object of this invention is to use, after cutting and rearranging to a certain extent, some of the parts of the rear axle structure and associated elements of a dismantled automobile, in the manufacture of the major portions of the running gear and main frame of my improved concrete mixer and the means for mounting and rotating the mixing drum thereof.

By using, in the manufacture of my improved concrete mixer, certain of the high grade and expensive parts of a dismantled automobile, it is possible to provide a novel structure, the cost of which would be prohibitive if the parts were new. By the use of the present efficient metal cutting and welding processes, it is possible to build a very high grade and efficient concrete mixer in part from certain of the parts of a dismantled automobile and sell the same at competitive prices.

To the above end, generally stated, the invention consists of the novel construction and arrangement of parts hereinafter described and defined in the claims.

In the accompanying drawings, which illustrate the invention, like characters indicate like parts throughout the several views.

Referring to the drawings:

Fig. 1 is a right-hand side elevation of the improved concrete mixer;

Fig. 2 is a rear elevation of the same, some parts being broken away and sectioned;

Fig. 3 is a fragmentary detail view partly in elevation and partly in central vertical section showing the mounting and part of the mechanism for rotating the mixing drum;

Fig. 4 is a detail view partly in elevation and partly in section taken on the line 4—4 of Fig. 1; and Fig. 5 is a fragmentary detail view, partly in central vertical section and partly in elevation, of the mixing drum, driving connections and housings therefor, on an enlarged scale.

The running gear for the improved concrete mixer includes an axle housing 6 formed by cutting the outer end portions of the rear axle housing of an automobile to the proper length and connecting the same at its inner ends by welding. On the outer ends of the these rear axle housing sections are the customary annular flanged collars 7 to which the brake drums and radius rods of an automobile are secured. An axle 8 extends axially through the housing 6 and is journaled in roller bearings, not shown, in said housing. A pair of wheels 9 equipped with pneumatic tires 10 is mounted on the axle 8. One of the wheels 9 is secured to the axle 8 for rotation therewith and the other thereof is free for relative rotation. As this is well known construction, it is not thought necessary to illustrate the same.

The main frame 11 of the improved cement mixer comprises a central longitudinal tubular member 12, a front tubular upright member 13 and a rear tubular upright member 14. The frame 11 is at the transverse center of the mixer and the longitudinal member 13 is in the same horizontal plane as the axle housing 6 and is rigidly secured at its rear end to said housing by welding. Both frame members 13 and 14 rest, at their lower ends, on the longitudinal member 12 and the axle housing 6, respectively, and are rigidly secured thereto by welding.

The frame 11 is normally supported at its front end by a short leg 15 having at its lower end a relatively wide transverse foot 16. As shown, the leg 15 is a flat plate set edgewise in the plane of the frame 11. This leg 15 extends considerably above the longitudinal member 13 in front of the frame member 13 and is rigidly secured to said members 12 and 13. A transverse handlebar 17 extends over the upper end of the leg 15 in front of the frame member 13 and is rigidly secured to said leg and member by welding. A pair of upwardly converging brace rods 18, for the foot 16, extend from the outer ends of said foot to the longitudinal frame member 12. Adjustably mounted on the leg 15 is a clevis or coupling member 19 for attaching the mixer, as a trailer, to an automobile for transporting said mixer from one job to the other.

The numeral 20 indicates a mixing drum mounted on an auxiliary frame 21 including a tubular longitudinal member 22 having an intermediate housing 23. A pair of upright hanger arms 24 are rigidly secured at their lower ends to the frame member 22 at its outer ends. These hanger arms 24 are secured at their upper ends to the inner ends of a pair of axially aligned stub shafts 25 journaled in the upright frame members 13 and 14 at their upper end portions. The housing 23 is the differential housing of an automobile and the upper and lower cover members 26 and 27, respectively, of the housing 23 are the horizontally disposed flanged flaring inner end portions of the rear axle housing. These housing cover members 26 and 27 are bolted to the housing 23 and are the remaining portions of the rear axle housing, the outer end portions thereof having been used to construct the axle housing 6. The rear section of the auxiliary frame member 21, is the rear end portion of the drive shaft housing of an automobile and has an annular flange 28 fitted against a similar flange 29 on a neck 30 integral with the main body of the housing 23. The front section of the auxiliary frame member 22 is a part cut from the drive shaft housing. The open ends of the cover members 26 and 27 are closed by plates, as indicated at 31.

The auxiliary frame 21 is oscillated about the axes of the stub shafts 25 and held in different oscillated positions by the following connection, to wit: a large spur gear 32 on the front stub shaft 25 is rigidly secured to the front hanger arm 24. A small spur pinion 33 meshing with the gear 32 is secured to the rear end of a short shaft 34 journaled in the upright frame member 13 at its upper end portion. The shaft 34 and hence the pinion 33 is rotated by a hand crank in the form of a relatively large wheel 35 secured to said shaft at its outer end and having a handle 36.

The mixing drum 20, at its bottom, rests on an annular plate 37 rigidly secured to said drum. This plate 37, in turn, is rigidly secured to the upper end of an upright shaft 38 in axial alignment with the vertical axis of the mixing drum 20 and perpendicular to the longitudinal axis of the auxiliary frame member 22.

A ring gear 39 in the housing 23 is keyed to the shaft 38 and upper and lower spiders 40 and 41, respectively, are rigidly secured to said ring gear. These spiders 40 and 41 are mounted on tapered roller bearings 42 in the cover members 26 and 27.

The ring gear 39, is driven, to rotate the mixing drum 20, by the following connections, to wit: A V-belt 43 which runs over a relatively small V-pulley 44 and a relatively large V-pulley 45. Said pulley 44 is secured on a shaft 46 driven by an electric motor or gas engine, not shown, mounted on a shelf or base 47. The pulley 45 is loosely journaled on the rear stub shaft 25 and a relatively small sprocket wheel 48 is secured to said pulley for common rotation therewith on the respective shaft 25. A sprocket chain 49 runs over the sprocket wheel 48 and a relatively large sprocket wheel 50 on the outer end of a shaft 51 in the rear section of the longitudinal auxiliary frame member 22. On the inner end of the shaft 51 is a spiral pinion 52 that meshes with the ring rear 39. The shaft 51 at its outer end portion is journaled in a straight roller bearing 53 in the respective section of the auxiliary frame member 22 and said shaft at its inner end portion is journaled in a pair of tapered roller bearings 54 in the housing neck 30. The elements 39, 40, 41 and 42 are parts of the differential mechanism of an automobile, the shaft 51 is a section of the driven shaft of an automobile, and the pinion 52 and roller bearings 53 and 54 are also parts of said automobile.

The shelf 47, at its ends, is mounted in angle bars 55 rigidly secured by brackets 56 to the flanges 7. These brackets 56 are formed from the spring hangers of the automobile.

For the sake of convenience, the mixing drum 20 is shown in an upright position, but when the same is being loaded or rotated, it is tilted into an oblique position on either side of the upright position.

By operating the hand wheel 35 the mixing drum 20 may be set in various different positions and held where positioned by the connections from said hand wheel to the auxiliary frame 21. Usually the mixing drum 20, while being loaded, is set in a tilted position on one side of the main frame 11 and when it is to be emptied, it is moved to the other side of said main frame.

All of the driven connections for rotating the mixing drum 20 that are directly below said drum are enclosed in housings and thereby kept free from materials that are spilled during the loading and the emptying of the mixing drum 20. The housings for the mixing drum rotating connections also make it possible to keep said connections well lubricated.

The drawings illustrate a commercial form of the invention, but it will be understood that the same is capable of certain modifications as to details of construction, arrangement and combination of parts within the scope of the invention herein disclosed.

What I claim is:

1. In a mixer of the kind described, an axle housing, an axle journaled in the housing, a pair of wheels mounted on the axle, a frame comprising a central longitudinal member rigidly secured at its rear end to the housing, a pair of upright members at the ends of the longitudinal member, a supporting leg on the front end of the longitudinal member, a mixing drum mounted on the frame, flanged collars on the end portions of the axle housing, upright brackets secured to said collars, and a motor or gas engine shelf mounted on said brackets.

2. In a mixer of the kind described, a main frame, an auxiliary frame including a horizontally disposed tubular member having at its ends a pair of upright arms, stub shafts pivotally connecting the arms at their upper ends to the main frame, means for oscillating the auxiliary frame, a housing on said member, a mixing drum having at its longitudinal axis a depending shaft journaled in said housing and rotatably supporting said drum, means for rotating the shaft including a driven pulley, a driven pulley loosely journaled on one of the stubs, a belt arranged to run over said pulleys, a sprocket wheel secured to the pulley and the respective stub shaft for common rotation therewith, a shaft journaled in the tubular member and having on its outer end a sprocket wheel, a sprocket chain arranged to run over the sprocket wheels, a ring gear on the shaft in the housing, and a pinion on the inner end of the shaft in the tubular member and meshing with the ring gear.

3. In a mixer of the kind described, an axle housing, an axle journaled in the housing, a pair of wheels mounted on the axle, a main frame comprising a central longitudinal member rigidly secured at its rear end to the housing and a pair of upright posts at the ends of said longitudinal member, an auxiliary frame comprising a central longitudinal member having at its ends a pair of upright arms pivoted at their upper ends to the posts and normally holding the respective longitudinal member substantially parallel to and suspended above the first noted longitudinal member with freedom for relative lateral oscillatory movement, means for oscillating the auxiliary frame, a mixing drum having on its bottom a rigidly secured depending shaft axially aligned therewith and journaled on the central longitudinal member of the auxiliary frame, and means for driving the shaft to rotate the mixing drum.

4. In a mixer of the kind described, an axle housing, an axle journaled in the housing, a pair of wheels mounted on the axle, a main frame comprising a central longitudinal member rigidly secured at its rear end to the housing and a pair of upright posts at the ends of said longitudinal member, an auxiliary frame comprising a central longitudinal member having at its ends a pair of upright arms pivoted at their upper ends to the posts and normally holding the respective longitudinal member substantially parallel to and suspended above the first noted longitudinal member with freedom for relative lateral oscillatory movement, a gear housing interposed in the longitudinal member of the auxiliary frame, means for oscillating the auxiliary frame, a mixing drum having on its bottom a rigidly secured depending shaft axially aligned therewith and journaled in the gear housing, and means for driving the shaft to rotate the mixing drum including a ring gear on the shaft in the gear housing.

5. The structure defined in claim 4 further including brackets on the axle housing, and a motor or gas engine shelf mounted on said brackets.

6. In a mixer of the kind described, an axle housing, an axle journaled in the housing, a pair of wheels mounted on the axle, a main frame comprising a central longitudinal member rigidly secured at its rear end to the housing and a pair of upright posts at the ends of the longitudinal member, an auxiliary frame including a longitudinal member comprising a discarded automobile differential housing having therein the customary bearings for the rear axle, the ring gear and its co-operating pinion and a section of the attached drive shaft, said differential housing having the outer end portions of the connected rear axle housing cut away, plates closing the open ends of the inner sections of the rear axle housing, axially aligned sections of the drive shaft housing secured to the differential housing at diametrically opposite points and a pair of upright arms on the outer ends of the sections of the drive shaft housing pivoted at their upper ends to the posts and normally holding the respective longitudinal member of the auxiliary frame substantially parallel to and suspended above the longitudinal member of the main frame with freedom for relative lateral oscillatory movement, means for oscillating the auxiliary frame, a mixing drum having on its bottom a rigidly secured depending shaft axially aligned therewith and journaled in said rear axle bearings, said ring gear being secured to the depending shaft, and driving connections for the depending shaft including the ring gear, the pinion and the connected section of the drive shaft.

EDWIN R. FESENMAIER.